United States Patent
Watanabe et al.

(10) Patent No.: US 6,343,742 B2
(45) Date of Patent: Feb. 5, 2002

(54) BAR CODE READER AND BAR CODE READING METHOD

(75) Inventors: Mitsuo Watanabe; Motohiko Itoh; Hiroaki Kawai; Isao Iwaguchi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/816,376

(22) Filed: Mar. 26, 2001

Related U.S. Application Data

(63) Continuation of application No. PCT/JP99/00583, filed on Feb. 10, 1999, now abandoned.

(30) Foreign Application Priority Data

Sep. 28, 1998 (JP) .......................................... 10-273250

(51) Int. Cl.[7] ................................................ G06K 7/10
(52) U.S. Cl. ........................... 235/462.25; 235/462.01; 235/462.07
(58) Field of Search ....................... 235/462.01, 462.07, 235/462.16, 462.25, 472.01

(56) References Cited

U.S. PATENT DOCUMENTS 5,780,832 A * 7/1998 Watanabe et al. ........... 235/463
6,142,377 A * 11/2000 Itoh et al. ............... 235/462.16
6,026,286 A1 * 5/2001 Watanabe et al. ...... 235/462.01

FOREIGN PATENT DOCUMENTS

JP 62-192483 12/1987
JP 5-12480 1/1993

* cited by examiner

Primary Examiner—Michael G. Lee
Assistant Examiner—Ahshik Kim
(74) Attorney, Agent, or Firm—Armstrong, Westerman, Hattori, McLeland & Naughton, LLP

(57) ABSTRACT

A bar code reader comprising a photodetecting section for receiving light reflected from bar codes scanned with scanning light and for outputting an electric signal corresponding to the intensity of light received, a demodulating section for demodulating section for demodulating the electric signal and for generating demodulation bar code data, a storage section for storing demodulation bar code data, a timing section which starts measuring a first time when the demodulation bar code data is stored in the storage section, an data judging section for judging which area, out of first and second areas to which the scanned range scanned with scanning light is divided, is scanned to generate the modulation bar code data demodulated by the demodulating section, a judging section for judging whether or not demodulated bar code data demodulated prior to demodulation bar code data and stored in the storage section coincides with the demodulation bar codes, and a judging section for judging that the demodulation bar code data is improper when the bar code data is generated by scanning the first area, when the judging section judges that the bar code data coincides with the modulation bar code data, and when the first time has elapsed, whereby the same bar codes prevented from being read doubly.

20 Claims, 12 Drawing Sheets

WPC CODE

| LGB (SGB) | 1 | 2 • • 6 | CB | 1 2 3 4 5 6 | RGB (EGB) |
|---|---|---|---|---|---| ns
BAR CODE READER AND BAR CODE READING METHOD

This is a continuation of Application PCT/JP99/00583, filed on Feb. 10, 1999, now abandoned.

BACKGROUND OF THE INVENTION

1. Field of the Invention

The present invention relates to a bar code reader and a bar code reading method.

2. Description of the Related Art

In recent years, as represented by POS systems in distributors, the management of goods or the like is generally performed by bar codes. For example, in a POS system of stores and shops, information such as the type and price of an item of goods is coded into the format of a bar code, and the bar code is printed on the goods. Thereafter, checkout is performed by reading the bar code on a cash register, and the number of sold goods are counted on real time. The number of sold goods is totaled, which is useful for stock control and purchase control.

In general, when a bar code is to be read on a cash register, as shown in FIG. 14, a bar code reader 100 is arranged on a counter 102 of a register 101. The reader 100 has an emission window 103 for emitting a laser beam for scanning a bar code. Each emission window 103 is arranged to face an operator S of the reader 100. On the entrance side of the counter 102, i.e., on the right of the emission window 103, a shopping basket X in which a shopper puts the goods is placed. Then, the operator S takes the goods out of the basket X one by one, and passes it in front of the reader 100, and places the goods into a basket Y. At this time, the operator S moves a bar code attached to each item toward the emission window 103. At this time, a laser beam emitted from the emission window 103 scans the bar code, its reflected light is detected by the reader 100, a bar code data based on the reflected light is demodulated, and the demodulation result (e.g., the price of an item) is displayed on a display device 107.

However, the reader 100 described above has the following problems. Namely, when an item of goods taken out of the basket X is a breakable thing, e.g., eggs or tofu, the bar code of the goods is read by the reader 100 once, and, for example, the goods may be temporarily placed between the basket X and the basket Y on the counter 102(called "temporary placed") (see an item of goods 108 in FIG. 14). Thereafter, as shown in FIG. 15, the temporarily placed goods 108 is stacked on a unbreakable goods contained in the basket Y by the operator S. At this time, the goods 108 is set within the scanning range of the laser beam emitted from each emission window 103, and the bar code of the goods 108 may be read again.

The positions at the baskets X and Y are placed are close to the reader 100, a part of the basket X or the basket Y may be set within the scanning range of the laser beam. In this case, the reader 100 may read the bar code of an item of goods which is contained in the basket X or the basket Y (to be referred to as "basket reading"). In this manner, the same bar code are read twice, the sum total of the prices of the goods may be erroneously calculated.

It is an object of the present invention to provide a bar code reader and a bar code reading method which can prevent the same bar code from being read twice.

SUMMARY OF THE INVENTION

The present invention adopts the following configuration to solve the above problems. More specifically, a first aspect of the present invention is a bar code reader. The bar code reader includes: a bar code data detection section for scanning a bar code to detect bar code data; a demodulation data generation section for generating a demodulation bar code data including data of the entire bar code from the bar code data detected by the bar code data detection section; a storage section for storing a plurality of demodulation bar code data generated by the demodulation data generation section; a clocking section for, when the demodulation bar code data is stored in the storage section, every demodulation bar code data, starting clocking of permission time in which the appropriateness of the same demodulation bar code data as the corresponding demodulation bar code data is recognized and of prohibition time in which the appropriateness of the same demodulation bar code data as the corresponding demodulation bar code data is rejected and which is ended after a lapse of the permission time; an area determination section for, when the demodulation bar code data is generated by the demodulation data generation section, specifying the demodulation bar code data as an object to be processed and for determining in which any one of a first area and a second area the demodulation bar code data to be processed is obtained when a scanning range of the bar code is divided by two with respect to a vertical surface; a detection section for, when it is determined by the area determining section that the demodulation bar code data to be processed is obtained in the first area, detecting from the storage section the same demodulation bar code data as the demodulation bar code data to be processed; and a determining section for, when the clocking of the permission time corresponding to the demodulation bar code data detected by the detection section is ended but the clocking of the prohibition time is not ended, determining the demodulation bar code data to be processed as inappropriate demodulation bar code data.

According to the first aspect, when the object to be processed is the same as the demodulation bar code data stored in the storage section, after the permission time of the demodulation bar code data is ended and before the prohibition time is ended, the demodulation bar code data to be processed is regarded as obtained by reading a bar code of temporary placed goods, and the appropriateness of the bar code data is rejected. In this manner, the same bar code can be prevented from being read twice.

A second aspect of the present invention is specified such that the determining section according to the first aspect determines the demodulation bar code data to be processed as appropriate demodulation bar code data when clocking of permission time corresponding to the demodulation bar code data detected by the detection section is not ended.

A third aspect of the present invention is specified such that the determining section according to the first aspect determines the demodulation bar code data to be processed as appropriate demodulation bar code data when it is determined by the area determining section that the demodulation bar code data to be processed is obtained in the second area.

A fourth aspect of the present invention is specified such that the bar code reader according to the first aspect further includes a character length detection section for detecting a character length of the demodulation bar code data to be processed when the demodulation bar code data is constituted by one bar code data obtained by one scanning operation, and an allowable value storage section for storing an allowable value of the character length of the demodulation bar code data, and wherein the determining section determines the demodulation bar code data to be processed as appropriate demodulation bar code data only when the character length detected by the character length detection section is less than the allowable value stored in the allowable value storage section.

A fifth aspect of the present invention is specified such that the bar code reader according to the first aspect further includes a basic character length detection section for, when the demodulation bar code data is constituted by a plurality of bar code data obtained by a plurality of scanning operations, detecting a basic character length which is a bar width per character of each bar code data constituting the demodulated bar code data, and a second determining section for determining the demodulation bar code data as inappropriate demodulation bar code data when the basic character lengths detected by the basic character length detection section do not satisfy a predetermined correlation between the character lengths.

A sixth aspect of the present invention is specified such that the demodulation bar code data according to the fifth aspect is formed by synthesizing a first bar code data and a second bar code data with each other, and the second determining section determines the demodulation bar code data as inappropriate demodulation bar code data when a difference between a basic character length of the first bar code data and a basic character length of the second bar code data is out of a predetermined range.

A seventh aspect of the present invention is specified such that the demodulation bar code data according to the fifth aspect is formed by synthesizing a first bar code data, a second bar code data, and a third bar code data with one another, and the second determining section determines the demodulation bar code data as inappropriate demodulation bar code data when a difference between a basic character length of the first bar code data and a basic character length of the second bar code data is out of a predetermined range or when a difference between a basic character length of the second bar code data and a basic character length of the third bar code data is out of a predetermined range.

An eighth aspect of the present invention is specified such that all the demodulation bar code data stored in the storage section are erased when the clocking section according to the first aspect ends the clocking of the permission time corresponding to the demodulation bar code data which is lastly stored in the storage section.

A ninth aspect of the present invention is specified such that the bar code reader according to the first aspect further includes a first area data storage section for storing the bar code data obtained in the first area of the bar code data detected by the bar code detection section, and a second area data storage section for storing the bar code data obtained in the second area of the bar code data detected by the bar code detection section, and the area determining section determines whether the demodulation bar code data to be processed is generated from the bar code data stored in the first area data storage section or the second area data storage section, thereby to determine whether the demodulation bar code data to be processed is obtained in the first area or the second area.

A tenth aspect of the present invention is specified such that the bar code data detection section according to the first aspect generates a bar code data including a type of data indicating that it is obtained in the first area and the second area, the demodulation data generation section generates a demodulation bar code data including a type of data, and the area determining section determines, based on the type of data included in the demodulation bar code data to be processed, whether the demodulation bar code data to be processed is obtained from the first area or the second area.

An eleventh aspect of the present invention is a bar code reading method including: a bar code data detection step by scanning a bar code to detect bar code data; a demodulation data generation step of generating demodulation bar code data including data of the entire bar code from the bar code data detected in the bar code data detection step; a storage step of storing a plurality of demodulation bar code data generated in the demodulation data generation step; a clocking step of, when the demodulation bar code data is stored in the storage step, every demodulation bar code data, starting clocking of permission time in which the appropriateness of the same demodulation bar code data as the corresponding demodulation bar code data is recognized and of prohibition time in which the appropriateness of the same demodulation bar code data as the corresponding demodulation bar code data is rejected and which is ended after a lapse of the permission time; an area determining step of, when the demodulation bar code data is generated in the demodulation data generation step, specifying the demodulation bar code data as an object to be processed and for determining whether the demodulation bar code data to be processed is obtained in a first area and a second area when a scanning range of the bar code is divided by two with respect to a vertical surface; a detection step of, when it is determined in the area determining step that the demodulation bar code data to be processed is obtained in the first area, for detecting the same demodulation bar code data as the demodulation bar code data to be processed from a plurality of demodulation bar code data stored in the storage step; and a determining step of, when the clocking of the permission time corresponding to the demodulation bar code data detected in the detection step is ended and a clocking of the prohibition time is not ended, determining the demodulation bar code data to be processed as inappropriate demodulation bar code data.

A twelfth aspect of the present invention is specified such that the determining step according to the eleventh aspect determines the demodulation bar code data to be processed as appropriate demodulation bar code data when clocking of permission time corresponding to the demodulation bar code data detected in the detection step is not ended.

A thirteenth aspect of the present invention is specified such that the determining step according to the eleventh aspect determines the demodulation bar code data to be processed as appropriate demodulation bar code data when it is determined in the area determining step that the demodulation bar code data to be processed is obtained in the second area.

A fourteenth aspect of the present invention is specified such that the bar code reading method according to the eleventh aspect further includes a character length detection step of detecting a character length of the demodulation bar code data to be processed when the demodulation bar code data is constituted by one bar code data obtained by one scanning operation, and the determining step determines the demodulation bar code data to be processed as appropriate demodulation bar code data only when the character length detected by the character length detection step is less than a predetermined allowable value.

A fifteenth aspect of the present invention is specified such that the bar code reading method according to the eleventh aspect further includes a basic character length detection step of, when the demodulation bar code data is constituted by a plurality of bar code data obtained by a plurality of scanning operations, detecting a basic character length which is a bar width per character of each bar code data constituting the demodulated bar code data, and a second determining step of determining the demodulation bar code data as inappropriate demodulation bar code data when basic character lengths detected in the basic character length detection step do not satisfy a predetermined correlation between the character lengths.

A sixteenth aspect of the present invention is specified such that the demodulation bar code data according to the fifteenth aspect is formed by synthesizing a first bar code data and a second bar code data with each other, and the second determining step determines the demodulation bar code data as inappropriate demodulation bar code data when a difference between a basic character length of the first bar code data and a basic character length of the second bar code data is out of a predetermined range.

A seventeenth aspect of the present invention is specified such that the demodulation bar code data according to the fifteenth aspect is formed by synthesizing a first bar code data, a second bar code data, and third bar code data with each other, and the second determining step determines the demodulation bar code data as inappropriate demodulation bar code data when a difference between a basic character length of the first bar code data and a basic character length of the second bar code data is out of a predetermined range or when a difference between a basic character length of the second bar code data and a basic character length of the third bar code data is out of a predetermined range.

An eighteenth aspect of the present invention is specified such that all the demodulation bar code data stored in the storage section are erased when the clocking step according to the eleventh aspect ends the clocking of the permission time corresponding to the demodulation bar code data which is lastly stored in the storage step.

A nineteenth aspect of the present invention is a bar code reader. The reader includes: a light receiving section for receiving reflected light from a bar code scanned by a scanning light to output an electric signal corresponding to an amount of received light; a demodulation section for demodulating the electric signal output from the light receiving section to generate a demodulation bar code data; a storage section for storing the demodulation bar code data; a clocking section for starting clocking of first time when the demodulation bar code data is stored in the storage section; an area determining section for determining whether the demodulation bar code data demodulated by the demodulation section is scanned in a first area and a second area which are obtained by dividing a scanning range of the scanning light; a discriminating section for determining whether the demodulated bar code data coincides with the demodulation bar code data which was demodulated prior to the demodulation bar code data and stored in the storage section; and a determining section for determining the demodulation bar code data as inappropriate demodulation bar code data when the bar code data is scanned in the first area, when it is determined by the discriminating section that the demodulated bar code data coincides with already demodulated bar code data, and when the first time has elapsed. In the nineteenth aspect, the number of divided scanning ranges is not limited.

A twentieth aspect of the present invention is a bar code reader. This reader includes: a light receiving section for receiving reflected light from a bar code scanned by a scanning light to output an electric signal corresponding to an amount of received light; a demodulation section for demodulating the electric signal output from the light receiving section to generate a demodulation bar code data; a storage section for storing the demodulation bar code data; an area determining section for determining whether the demodulation bar code data demodulated by the demodulation section is scanned in a first area and a second area which are obtained by dividing a scanning range of the scanning light; a discriminating section for determining whether the demodulated bar code data coincides with the demodulation bar code data which was demodulated prior to the demodulation bar code data and stored in the storage section; and a determining section for determining the demodulation bar code data as inappropriate demodulation bar code data when the bar code data is scanned in the first area and when it is determined by the discriminating section that the demodulated bar code data coincides with already demodulated bar code data.

DETAIL DESCRIPTION OF THE PREFERRED EMBODIMENT

The best mode (preferred embodiment) for carrying out the invention will be described below with reference to the drawings.

<Configuration of Bar Code Reader>

Figure 1:
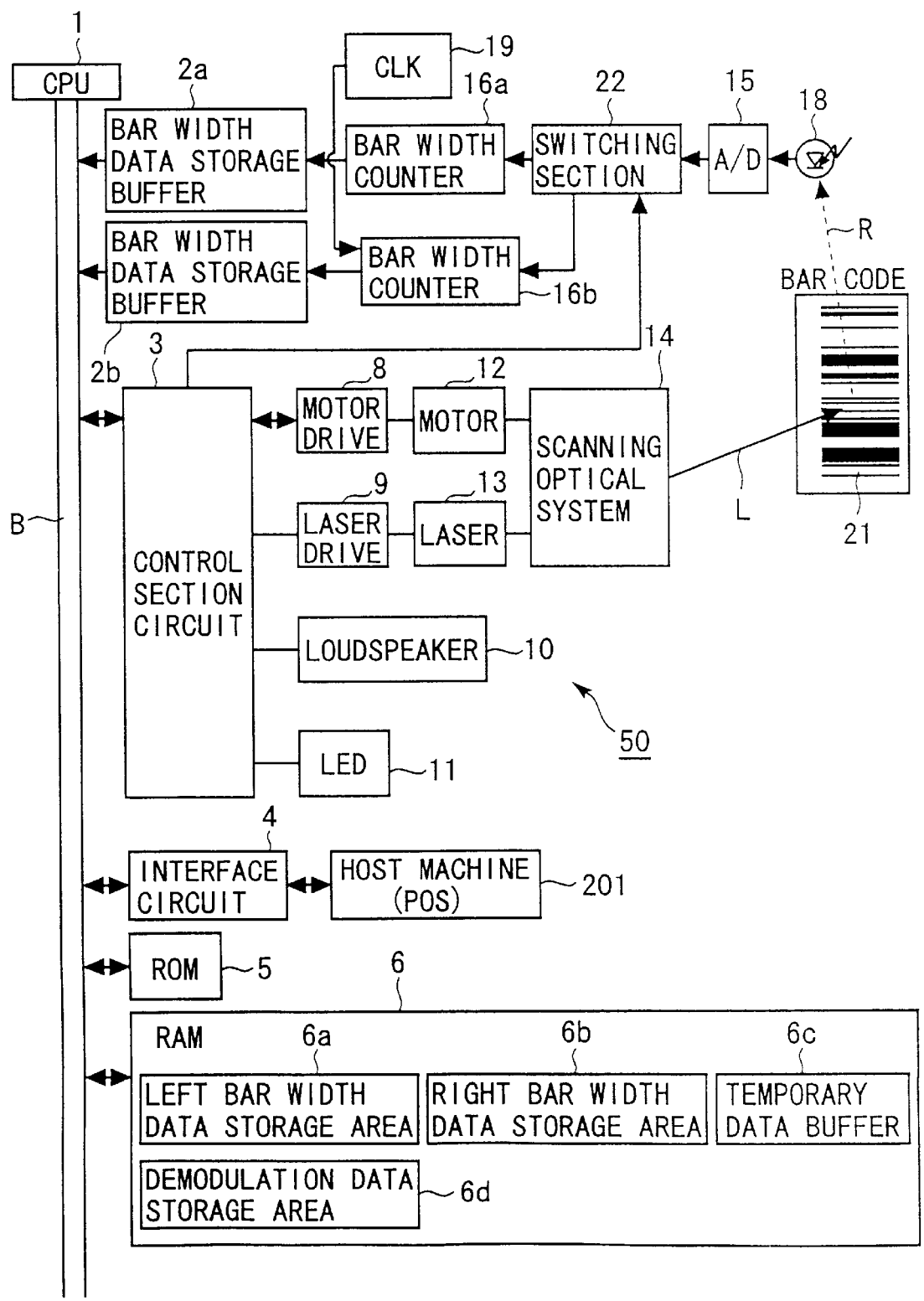
FIG. 1 is a structural diagram of a bar code reader according to an embodiment of the present invention.
Figures 2, 3:
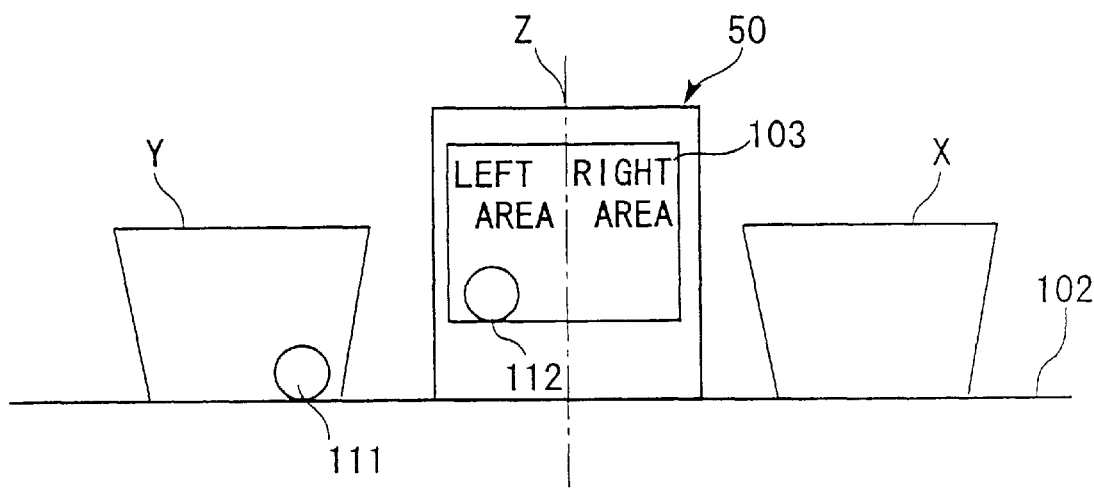
FIG. 2 is a front view showing a part of the appearance of the bar code reader shown in FIG. 1.
FIG. 3 is a diagram for explaining the bar code shown in FIG. 1.
Figure 14:
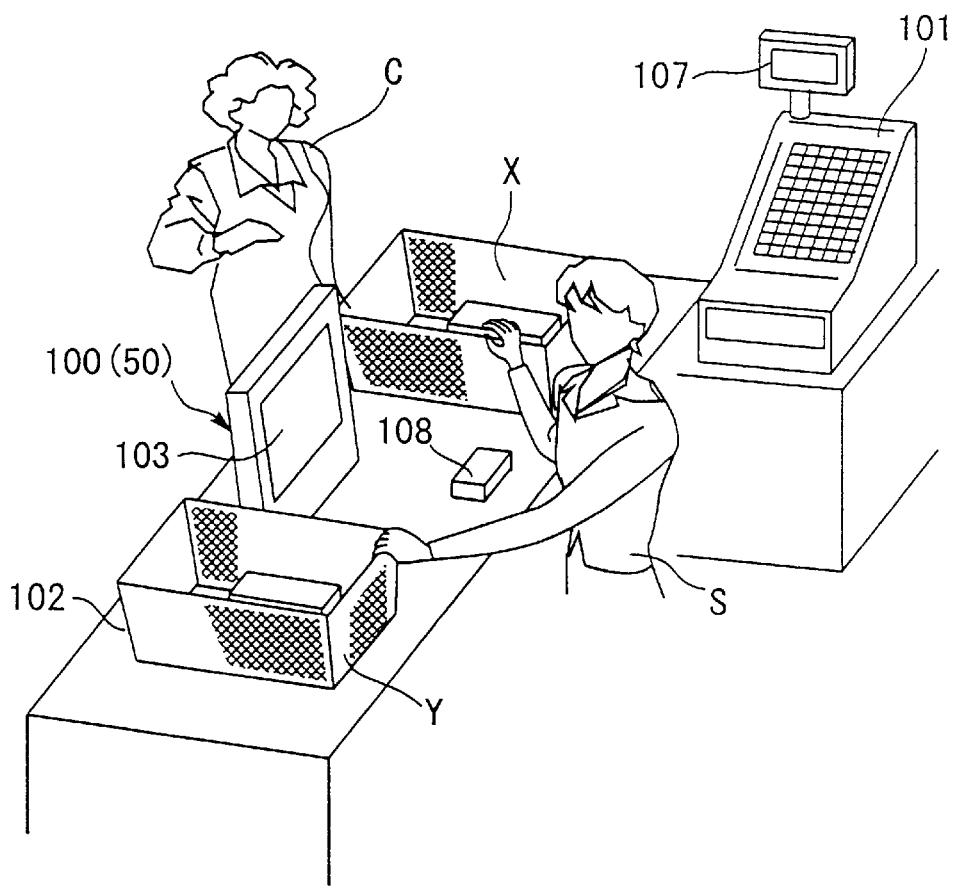
FIG. 14 is a diagram for explaining the bar code reader.
Figure 15:
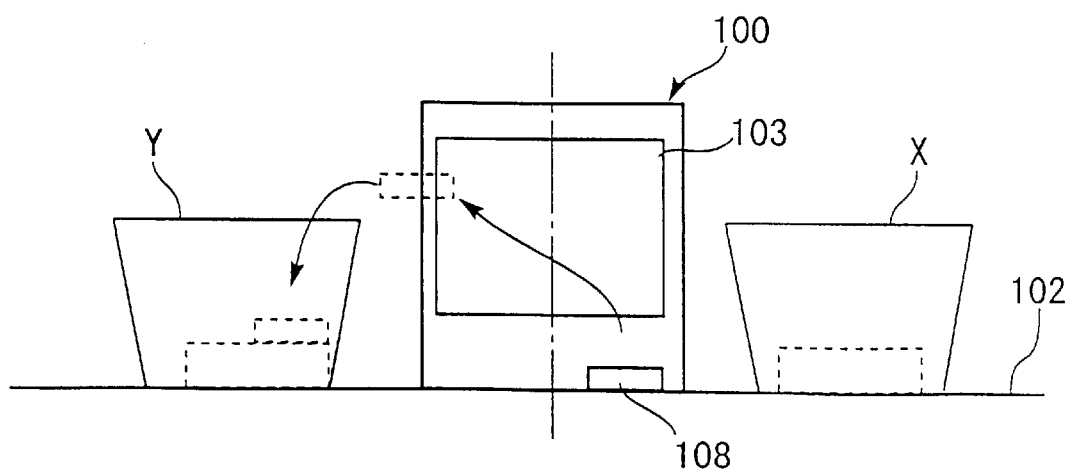
FIG. 15 is a diagram showing conventional problems.

FIG. 1 is a block diagram showing a schematic configuration of a bar code reader 50. The bar code reader 50 partially constitutes a POS terminal installed in, e.g., a store, and has the same appearance and configuration as that of a bar code reader 100 shown in FIG. 14. As shown in FIG. 2, in the bar code reader 50, a scanning range scanned by a laser beam emitted from an emission window 103 is divided by two with respect to a vertical surface and defined one are as a right area (corresponding to a first area) where second by laser beam from the right emission window, and the other area as a left area (corresponding to a second area), where is scanned by the laser beam from the left emission window.

The bar code reader 50 reads a bar code 21 according to, for example, UPC/A, EAN-13 of WPC code. FIG. 3 is a diagram showing an example of the bar code 21 shown in FIG. 1. Referring to FIG. 2, the bar code 21 has guard bars, i.e., a left guard bar (LGB: start guard bar (SGB)) and a right guard bar (RGB: end guard bar (EGB)) and a center bar (CB), and has a left data block constituted by 6 characters sandwiched by the LGB and the CB, and a right data block constituted by 6 characters sandwiched by the CB and the RGB. Each character is constituted by 7 modules, and each module is constituted by two white bars (a bar and c bar) and two black bars (b bar and d bar). Each black bar is constituted by 1 to 4 modules depending on the value of a character.

In FIG. 1, the bar code reader 50 has a CPU 1, bar width data storage buffers 2a and 2b, a control section circuit 3, an interface circuit 4, a ROM 5, a RAM 6, a bar width counter 16a connected to the bar width data storage buffer 2a, a bar width counter 16b connected to the bar width data storage buffer 2b, a clock 19 and a switching section 22 respectively connected to the bar width counters 16a and 16b, an A/D converter 15 connected to the switching section 22, a light-receiving element 18 connected to the A/D converter 15, a motor drive circuit 8 connected to the control section circuit 3, a laser drive circuit 9, a speaker 10 and an LED 11, a motor 12 connected to the motor drive circuit 8, a scanning optical system 14 driven by the motor 12, and a semiconductor laser 13 connected to the laser drive circuit 9, all of which are connected to one another through a bus B.

The ROM 5 is a read-only memory in which a bar code recognition program and a demodulation process program are stored. The CPU 1 executes the bar code recognition program and the demodulation process program stored in the ROM 5 to control the bar code reader as a whole, and demodulates the bar width data groups obtained by reading the bar code 21, respectively thereby to reproduce the data corresponding to the entire bar code 21.

The interface circuit 4 controls the status of the bus B and controls data transmission or the a host machine (host computer) 201.

The control section circuit 3 controls the motor drive circuit 8, the laser drive circuit 9, the speaker 10, and the light-emitting diode (LED) 11. The motor drive circuit 8 drives the motor 12 to rotate an unillustrated polygon mirror constituting the scanning optical system 14. The laser drive circuit 9 drives the semiconductor laser 13 to cause the semiconductor laser 13 to emit a laser beam L. The speaker 10 generates a sound representing the completion of read of the bar code. The light-emitting diode 11 is a display element for displaying information (e.g., the price or the like of an item of goods) obtained as a result of demodulation of the bar code 21.

The laser beam L emitted from the semiconductor laser 13 is incident on the scanning optical system 14 and polarized by the scanning optical system 14. More specifically, the scanning optical system 14 polarizes the laser beam L in one direction by the unillustrated polygon mirror rotated by the motor 12. On the opposite side of the polygon mirror, a plurality of fixed mirrors are fixed. Therefore, the laser beam L polarized by the polygon mirror is reflected by the respective fixed mirrors again, so that the polarizing direction (scanning direction) of the laser beam is changed into various directions. According to the scanning optical system 14, the laser beam scanning in a plurality of directions is continuously performed at a high speed within a polarizing cycle obtained by one reflective surface of the polygon mirror. Each of the plurality of laser beam scanning traces performed within the polarizing cycle obtained by one reflective surface of the polygon mirror will be called "one scanning" in the following description.

When the scanned laser beam L is incident on the bar code 21, the laser beam L is diffused on the surface, and a part of the reflected light component R is received by the light-receiving element (photodiode) 18. The A/D converter 15 compares an elective current value representing the brightness of the reflected light component R received by the light-receiving element 18 with a predetermined threshold value, and converts the value into a binary signal. This binary signal represents "H" when the intensity of the reflected light component R corresponds to the reflectance of a black bar in the bar code 21, and represents "L" when the intensity of the reflected light component R corresponds to the reflectance of a white bar in the bar code 21.

Figure 4:
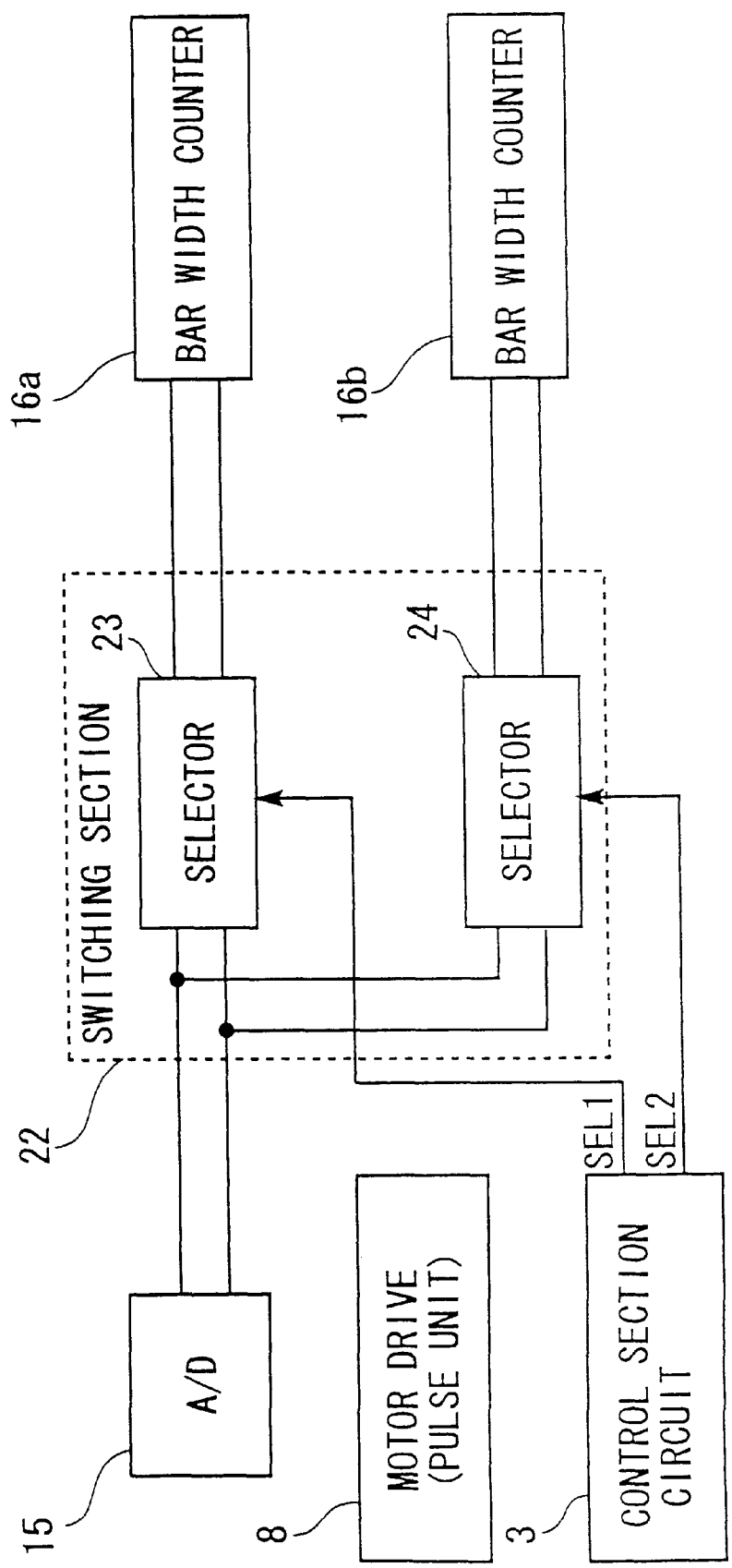
FIG. 4 is a diagram showing the configuration of a switching section shown in FIG. 1.

The switching section 22 gives the binary signal generated by the A/D converter 15 to the bar width counters 16a and 16b on the basis of a control signal from the control section circuit 3. FIG. 4 is a diagram of the switching section 22. Referring to FIG. 4, the switching section 22 has selectors 23 and 24. The selector 23 is connected to the A/D converter 15 and the control section circuit 3, and also connected to the bar width counter 16a. On the other hand, the selector 24 is connected to the A/D converter 15 and the control section circuit 3, and also connected to the bar width counter 16b.

Figure 5:
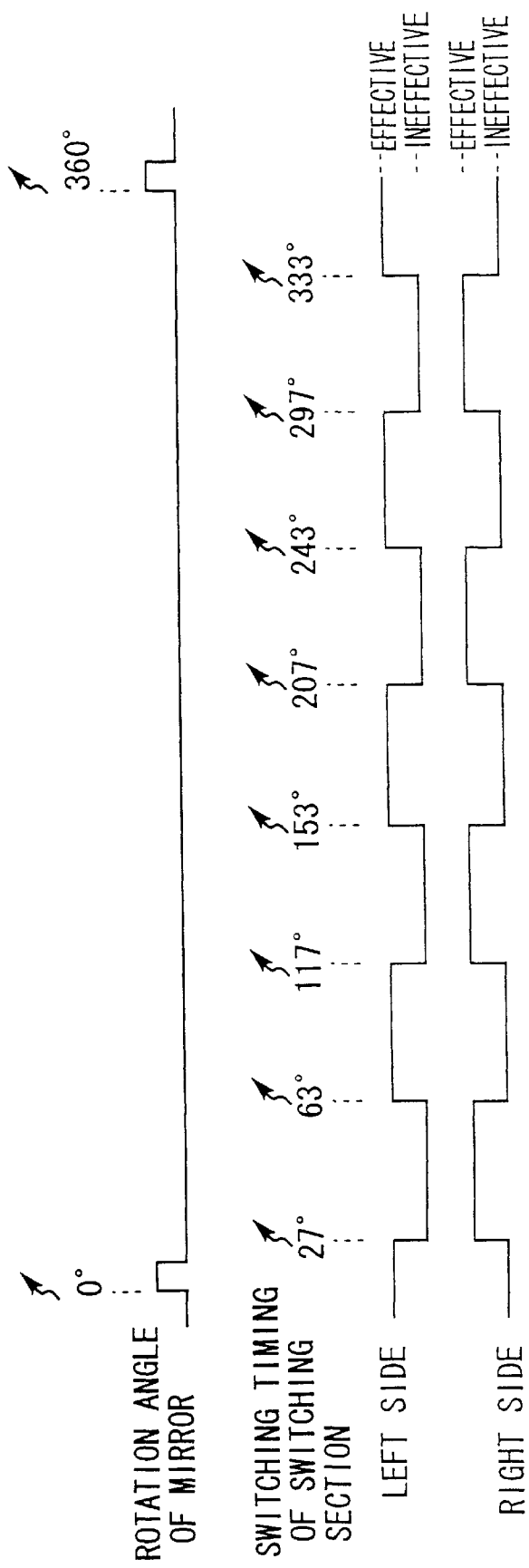
FIG. 5 is a diagram for explaining switching control of the switching section shown in FIG. 3.

The selectors 23 and 24 are operated by the control section circuit 3 as described below. More specifically, the motor drive circuit 8 has a pulse unit for generating a rotation timing of the unillustrated polygon mirror. The pulse unit, as shown in FIG. 5, generates pulses to rise when the rotation angles of the unillustrated polygon mirror are 0° and 360°. The control section circuit 3 detects rising pulses from the motor drive circuit 8 to calculate data of time required for one rotation of the polygon mirror. In this manner, the rotation angle of the polygon mirror is calculated, and an enable signal or a disable signal depending on the rotation angle of the polygon mirror is given to the selectors 23 and 24.

For example, as shown in FIG. 5, when the rotation angle ranges from 27° to 63°, the control section circuit 3 gives a disable signal as a signal SELL to the selector 23, and gives an enable signal as a signal SEL2 to the selector 24. When the rotation angle ranges from 63° to 117°, the control section circuit 3 gives an enable signal as the signal SELL to the selector 23, and gives a disable signal as a signal SEL2 to the selector 24. In this manner, the control section circuit 3 alternately gives the enable signal and the disable signal to the selectors 23 and 24. Because of this, a binary signal of the bar code 21 scanned in the left area is input to the bar width counter 16a, and a binary signal of the bar code 21 scanned in the right area is given to the bar width counter 16b.

Each of the bar width counters 16a and 16b measures, on the basis of the binary signal input from the A/D converter 15, time (expected to correspond to the width of a black bar in the bar code 21) from a rise timing to a fall timing of the binary signal, and time (expected to correspond to the width of a white bar in the bar code 21) from the fall timing to the rise timing of the binary signal.

The bar width counters 16a and 16b count the number of clocks from the clock 19 to count clocking times corresponding to the bar widths. Read data (bar code data) of each bar which is output from the respective bar width counters 16a and 16b has a configuration obtained by combining a count value and a color identification signal representing white or black, and such read data are continuously output per each scanning operation of the laser beam. The read data obtained per each scanning operation and continuously output in this manner is called a "bar width data group".

The bar width data group is temporarily stored in the bar width data storage buffers 2a and 2b. The bar width data storage buffers 2a and 2b sequentially store bar width data groups input from the associated bar width counters 16a and 16b, and give the bar width data groups to the CPU 1 one by one in the order of storage at a request from the CPU 1.

The work area for various processes performed by the CPU 1 is developed in the RAM 6. The RAM 6 stores a bar code data group read from the bar width data storage buffer 2. For this reason, the RAM 6 has a left bar width data storage area 6a in which the bar width data group stored in the bar width data storage buffer 2a is stored and a right bar width data storage area in which the bar width data group stored in the bar width data storage buffer 2b is stored. The RAM 6 has a temporary buffer 6c in which a demodulation data, the reading of which is determined as OK, is temporarily stored and has a demodulation data storage area 6d.

Figure 9:
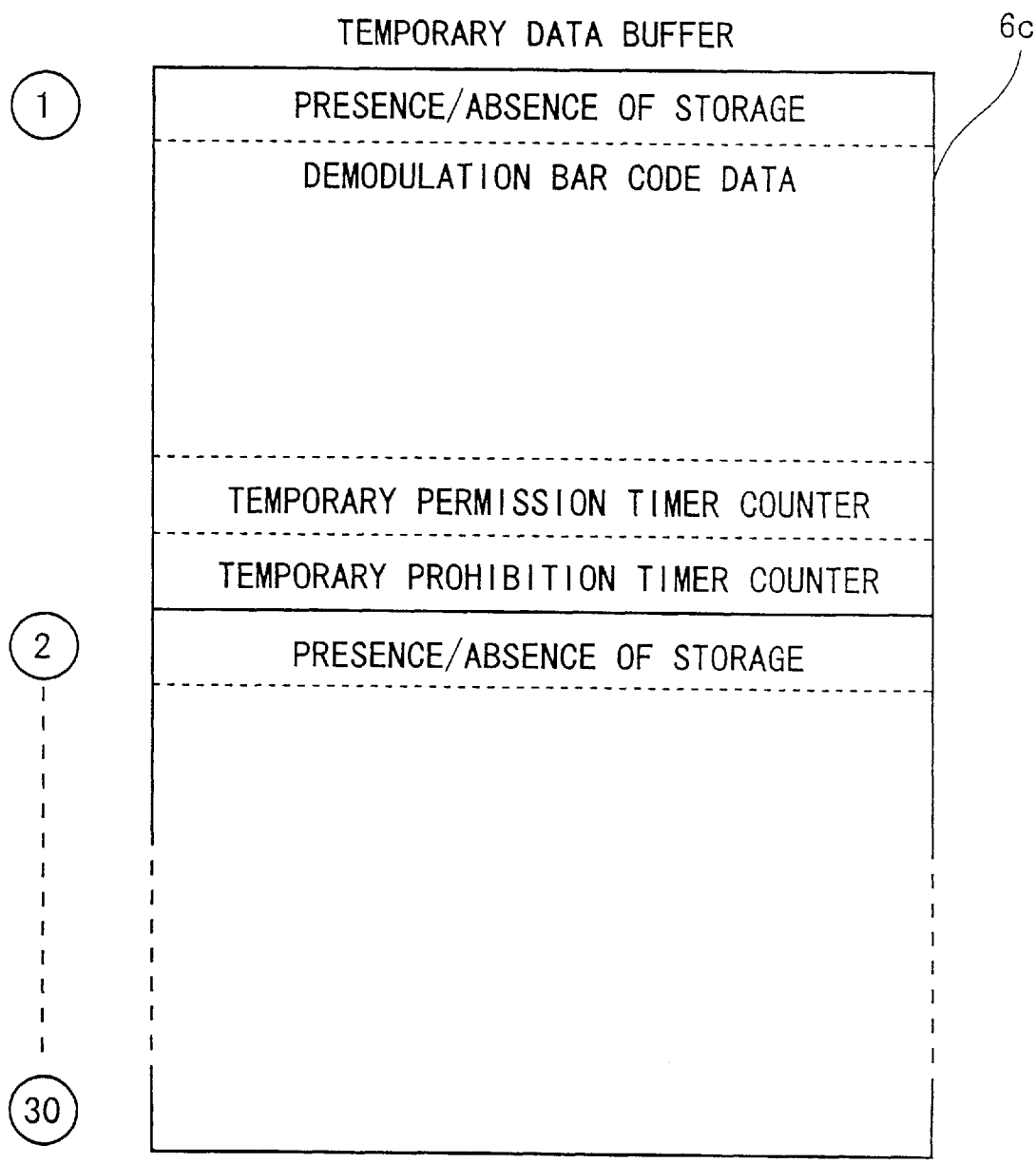
FIG. 9 is a diagram for explaining the temporary placed data buffer shown in FIG. 1.

FIG. 9 is a diagram for explaining the temporary buffer 6c. In FIG. 9, the temporary buffer 6c consists of a plurality of blocks (30 blocks in this embodiment). Each block stores a flag representing the presence/absence of storage of bar code data, bar code data the reading of which is determined as OK, a counter for a temporary permission timer, and a counter for a temporary prohibition timer. Here, the temporary permission timer is a timer for clocking time for allowing that, after the bar code 21 of a certain item of goods is read, the item is temporarily placed on the counter 102 on the right area side, and the temporary prohibition timer is for clocking time for prohibiting that, after the bar code 21 of a certain item of goods is read, the item is prohibited from being temporarily placed on the counter 102 on the right area side. In the respective blocks, bar code data, the reading of which is determined as OK, are sequentially stored from the top block.

The control section circuit 3, the motor drive circuit 8, the laser drive circuit 9, the motor 12, the semiconductor laser 13, the scanning optical system 14, the A/D converter 15, the bar width counters 16a and 16b, the light-receiving element 18, the clock 19, and the bar width data storage buffers 2a and 2b correspond to the bar code data detection section according to the present invention.

The light-receiving element 18 corresponds to the light-receiving section according to the present invention, and the A/D converter 15, the bar width counters 16a and 16b, the clock 19, the bar width data storage buffers 2a and 2b, and the CPU 1 correspond to the demodulation section according to the present invention.

The CPU 1 functions as the demodulation data generation section, the clocking section, the area determining section, the detection section, the determining section, the character length detection section, the basic character length detection section, the second determining section, and the discriminating section. The temporary buffer 6c corresponds to the storage section according to the present invention, and the RAM 6 corresponds to the allowable value storage section according to the present invention. The left bar width data storage area 6a corresponds to the second area data storage section, and the right bar width data storage area 6b corresponds to the first area data storage section according to the present invention.

<Process by CPU>

Figure 6:
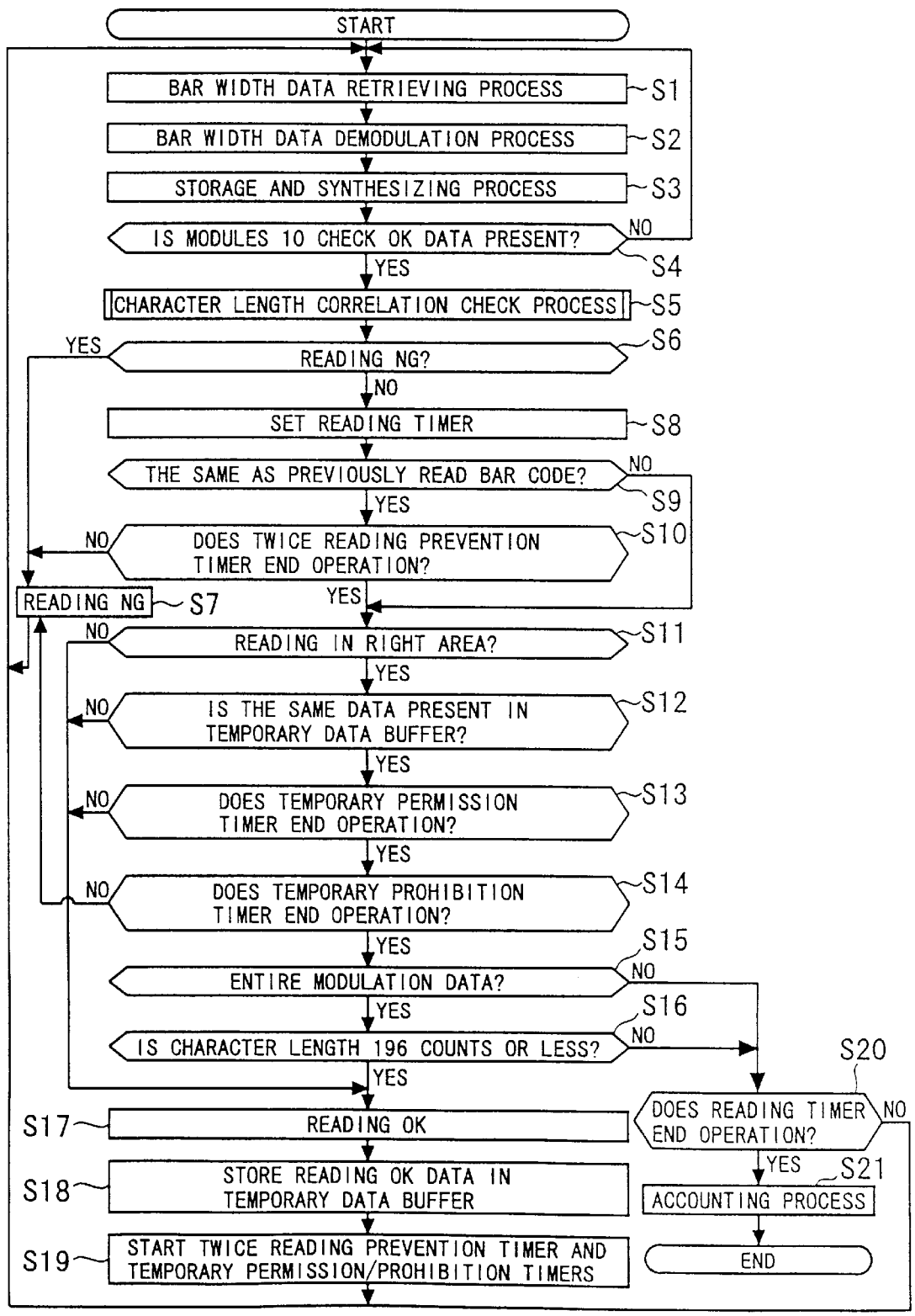
FIG. 6 is a flow chart showing processes performed by the CPU shown in FIG. 1.

A process executed by the CPU 1 will be described below with reference to the flow charts shown in FIGS. 6 to 8. FIG. 6 shows a main routine of the process executed by the CPU 1. This main routine is started, with the following processes as a prerequisite. More specifically, when the main power supply of the bar code reader is turned on, the CPU 1 performs a bar code recognition process. In this manner, the bar code 21 is scanned, and a plurality of bar width data groups are stored in the bar width data storage buffers 2a and 2b. Thereafter, the CPU 1 reads the bar width data groups from the bar width data storage buffers 2a and 2b, and stores the bar width data groups in the left bar width data storage area 6a or the right bar width data storage area 6b of the RAM 6. Thereafter, the CPU 1 starts the execution of the main routine.

First, the CPU 1 performs a bar width data retrieving process (step S1). More specifically, the CPU 1 detects a bar width data group stored in the left bar width data storage area 6a or the right bar width data storage area 6b according to a predetermined bar code retrieving pointer.

The CPU 1 performs a bar width data demodulation process (step S2). More specifically, the CPU 1 performs a demodulation process to the bar width data group detected in step S1 to obtain demodulation data by demodulating the bar width data group. At this time, the CPU 1 calculates data (basic character length data) of a bar width count value per character of the demodulation data and a data type representing whether the demodulation data is a demodulation data obtained in the right area or a demodulation data obtained in the left area. The data type is determined depending on an area at which a present bar code retrieving pointer currently points, i.e., the left bar width data storage area 6a or the right bar width data storage area 6b.

The CPU 1 performs a demodulation data storage/synthesizing process (step S3). More specifically, the CPU 1 stores the demodulation data obtained in step S2 in the demodulation data storage area 6d together with the basic character length data and the data type. At this time, when demodulation data to be stored is obtained by scanning the entire bar code 21 (to be referred to as "entire scanning data") the CPU 1 directly stores the corresponding entire demodulation data in the demodulation data storage area 6d.

In contrast to this, when the demodulation data to be stored is related to apart of the bar code 21, the CPU 1 retrieves demodulation data related to the other part of the bar code 21 from the demodulation data storage area 6d. At this time, if the demodulation data related to the other part exists, the CPU 1 synthesizes the demodulation data with each other. The CPU 1 stores the synthesized demodulation data obtained as the result in the demodulation data storage area 6d. On the other hand, if the demodulation data related to the other part does not exist, the CPU 1 directly stores the demodulation data to be stored in the demodulation data storage area 6d. In this embodiment, the synthesizing process is performed regardless of the data type of the demodulation data to be synthesized and stored in the demodulation data storage area 6d. However, the synthesizing process may be performed only when the demodulation data to be synthesized have the same data type.

The CPU 1 performs modules 10 check to the demodulation data stored in the demodulation data storage area 6d or the synthesized demodulation data which includes the data of the entire bar code 21, and the CPU 1 determines whether demodulation data satisfies that the modules 10 check is "OK" exists or not (step S4). At this time, when the demodulation data which satisfies that the modules 10 check is "OK" does not exist (S4; N), the CPU 1 returns the process to step S1 to perform processes from steps S1 to S3 with respect to other bar width data group. In contrast to this, when the demodulation data which satisfies the modules 10 check is "OK" exists (S4; Y), the CPU 1 executes the sub-routine of the character length correlation check process shown in FIG. 7 (step S5).

Figure 7:
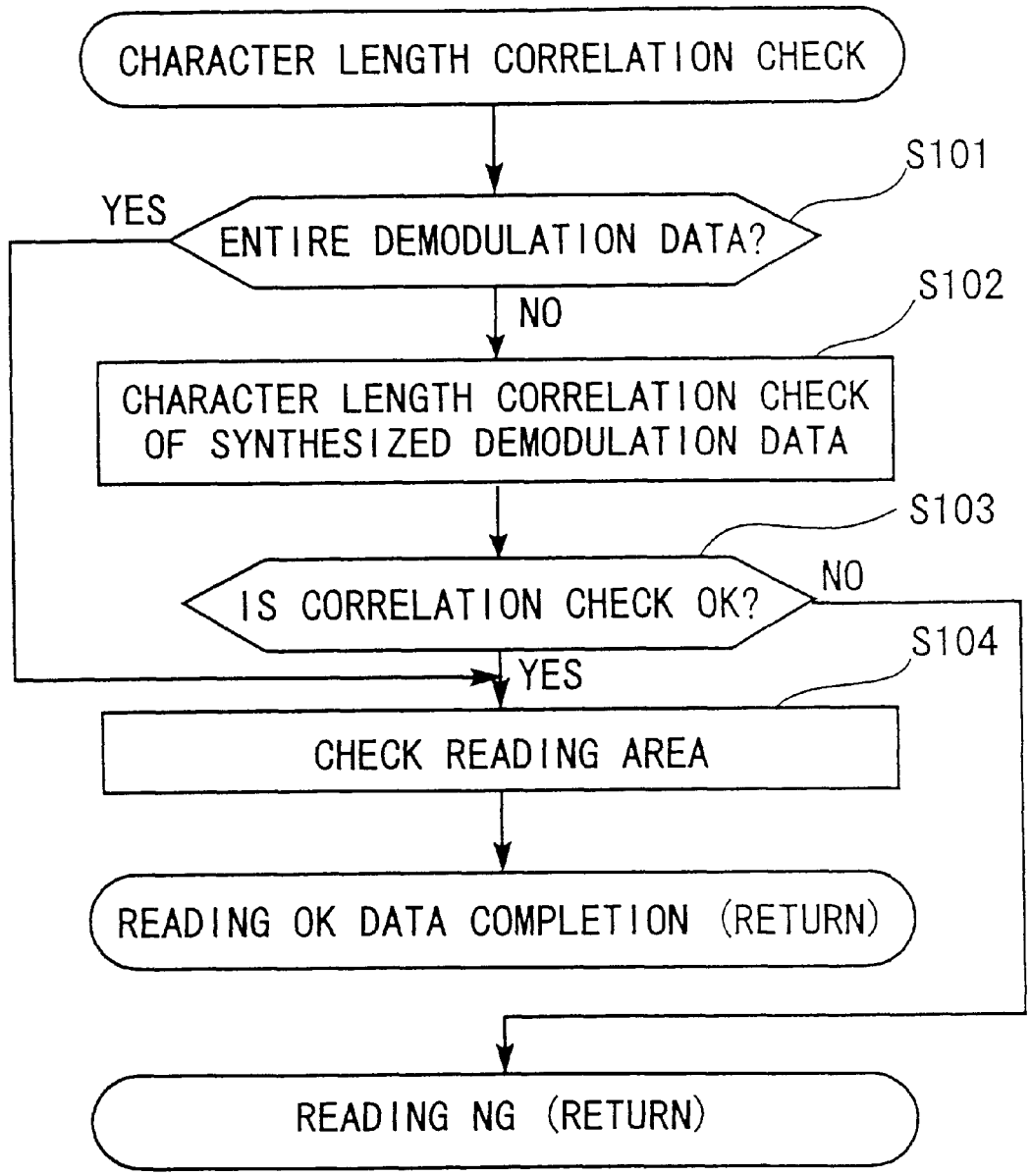
FIG. 7 is a flow chart showing a character length correlation check process shown in FIG. 6.

In FIG. 7, the CPU 1 first determines whether the demodulation data subjected to this process are the entire demodulation data or not (step S101). At this time, the demodulation data are the entire demodulation data (S101; Y), the CPU 1 shifts the process to step S104. In contrast to this, when the demodulation data are not the entire demodulation data (S101; N), the CPU 1 shifts the process to step S102.

In step S102, the CPU 1 performs a character length correlation check process for synthesized demodulation data (corresponding to the second determining section according to the present invention). More specifically, the CPU 1 performs the following process depending on the number of demodulation data constituting the synthesized demodulation data. When the synthesized demodulation data is constituted by two demodulation data, the CPU 1 checks whether the basic character length data of the two demodulation data (to be referred to as "data D1" and "data D2") satisfy the following condition (correlation):

0.5*(multiplication) D1<D2<1.5*(multiplication) D1.

At this time, when the two demodulation data satisfy the above condition, the CPU 1 determines that the correlation check is OK. When the two demodulation data do not satisfy the condition, the CPU 1 determines that the correlation check is NG.

On the other hand, when the synthesized demodulation data is constituted by three demodulation data, the CPU 1 checks whether the basic character length data of three synthesized data (to be referred to as "data D3", "data D4", and "data D5") satisfy the following conditions (correlations) or not:

0.5*D3<D4<1.5*D3
and
0.5*D4<D5<1.5*D4.

At this time, when the three demodulation data satisfy the above conditions, the CPU 1 determines that the correlation check is OK. When the three demodulation data do not satisfy the conditions, the CPU 1 determines that the correlation check is NG.

Thereafter, the CPU 1 determines whether the result of the correlation check process is OK or not (step S103). When the correlation check is NG (S103; N), the CPU 1 recognizes that reading of the bar code 21 is NG, ends the execution of the sub-routine, and returns the process to the main routine shown in FIG. 6. In contrast to this, when the result of the correlation check process is OK (S103; Y), the CPU 1 shifts the process to step S104.

When the process shifts to step S104, the CPU 1 performs a read area check process. More specifically, the CPU 1 reads the data type of demodulation data constituting all the demodulation data or the synthesized demodulation data, and checks whether the demodulation data are obtained in the right area or the left area. However, if it is found in the check process in step S104 that the synthesized demodulation data is obtained by synthesizing the demodulation data in the right area and the demodulation data in the left area with each other, the CPU 1 determines that the synthesized demodulation data is obtained in the right area.

Thereafter, the CPU 1 determines that the reading of the bar code 21 is "OK", i.e., that the demodulation data of the appropriate bar code data 21 is obtained, and the CPU 1 ends the execution of the sub-routine to shift the process to the main routine shown in FIG. 6.

By the character length correlation check described above, so-called "basket reading" is prevented. More specifically, for example, as shown in FIG. 2, it is assumed that there are two item of goods 111 and 112, that the item 111 is in a basket Y, and that the item 112 is caused to pass in front of the emission window 103 by an operator S. In this case, when the bar codes 21 attached to the items 111 and 112 are within the scanning range of the laser beam emitted from the emission window 103, an erroneous synthesized demodulation data may be formed by the demodulation data of the bar code 21 of the items 111 and the demodulation data of the bar code 21 of the item 112.

Here, when the positional relationship between the items 111 and 112 and the emission window 103 is considered, it may be understood the distance between the item 111 held in the basket Y and the emission window 103 is longer than the distance between the item 112 and the emission window 103. This relationship is also established when the item 111 is held in a basket X. A scanning speed of the laser beam changes depending on the optical path length to the bar code 21. As a result, the bar width data group of the bar code 21 of the item 111 and the bar width data group of the bar code of the item 112 are different from each other in count values per character.

Therefore, when the basic character lengths of the demodulation data constituting the synthesized demodulation data do not satisfy the above conditions, any one of the demodulation data is determined as the demodulation data of the bar code 21 held in the basket X or the basket Y, and the reading of the bar code 21 is determined as NG (demodulation data is inappropriate). In this manner, the so-called "basket reading" is prevented.

Upon completion of the character length correlation check process in step S5, the CPU 1 determines whether the reading of the bar code 21 is NG or not (step S6). At this time, when the reading is NG (S6; Y), the CPU 1 executes a process for notifying the operator S that the reading of the bar code 21 is NG (step 37), and returns the process to step S1. By the process in step S7, for example, the speaker 10 outputs voice representing that the reading is NG, and the LED 11 displays reading NG. In contrast to this, when the reading is not NG (S6; N), the CPU 1 shifts the process to step S8.

In step S8, the CPU 1 sets a reading timer (10 seconds in this embodiment). This reading timer is a timer for determining whether reading of the bar codes 21 of all goods to be purchased by one customer is ended. The reading timer is realized by using a clock incorporated in the CPU 1.

Next, the CPU 1 determines whether the entire demodulation data or the synthesized demodulation data (the entire demodulation data and the synthesized demodulation data are collectively referred to as "demodulation bar code data" hereinafter) the reading of which is determined as OK are the same as the demodulation bar code data the reading of which is determined as OK in the previous step S6 or not (step S9). At this time, when the demodulation bar code data are not the same (S9; N), the process shifts to step S1. In contrast to this, when the demodulation bar code data are the same (S9; Y), the process shifts to step S10.

When the process shifts to step S10, the CPU 1 determines whether the time of a twice reading prevention timer (to be described later) is not up (S10; N), and when the bar code 21 attached to one item of goods is continuously read twice the CPU 1 executes a process related to reading NG (step S7), and returns the process to step S1. In contrast to this, when the twice reading prevention timer ends the operation (S10; Y), the CPU 1 shifts the process to step S11. The twice reading prevention timer is a timer for, after the bar code 21 of an item of goods is read, clocking the time for preventing the bar code 21 of the same item from being read again.

When the process shifts to step S11, the CPU 1 determines whether the demodulation bar code data, the reading of which is OK at present, is obtained in the right area. The process is performed such that the CPU 1 determines the contents of a data type corresponding to the demodulation bar code data. When the demodulation bar code data is not obtained in the right area (obtained in the left area) (S11; N), the CPU 1 shifts the process to step S17. In contrast to this, when the demodulation bar code data is obtained in the right area (S11; Y), the CPU 1 shifts the process to step S12.

When the process shifts to step S12, the CPU 1 determines whether the same demodulation bar code data as the present demodulation bar code data is stored in the temporary buffer 6c or not. At this time, when the same demodulation bar code data does not exist (S12; N), the CPU 1 shifts the process to step S17. In contrast to this, when the same demodulation bar code data exists, the CPU 1 shifts the process to step S13.

When the process shifts to step S13, the CPU 1 determines whether the time of a temporary permission timer in a block in which the same demodulation bar code data is stored ends. At this time, when the temporary permission timer does not end the operation (S13; X), the CPU 1 shifts the process to step S17, otherwise (S13; Y), the CPU 1 shifts the process to step S14.

When the process shifts to step S14, the CPU 1 determines whether the time of a temporary prohibition timer in a block in which the same demodulation bar code data is stored ends. At this time, when any temporary prohibition timer ends the operation (S14; Y), the CPU 1 shifts the process to step S7 to perform the process related to reading NG. In contrast to this, when the temporary prohibition timer ends the operation (S14; N), the CPU 1 shifts the process to step S15.

When the process shifts to step S15, the CPU 1 determines that the present demodulation bar code data are the entire demodulation bar code data or not. At this time, when the demodulation bar code data are not the entire demodulation bar code data (S15; N), the CPU 1 shifts the process to step S20. When the demodulation bar code data are the entire demodulation bar code data (S15; Y), the CPU 1 shifts the process to step S16.

When the process shifts to step S16, the CPU 1 determines whether the count value of the character length of the present demodulation bar code data is 196 counts or less. At this time, when the count value exceeds 196 counts (S16; N), the CPU 1 shifts the process to step S20. When the count value is 196 counts or less (S16; Y), the CPU 1 shifts the process to step S17. The count value "196" is stored in the RAM 6 as an allowable value for determining whether the demodulation bar code data is appropriate or not.

When the process shifts to step S17, the CPU 1 determines that the reading of the bar code 21 is OK, and executes the process for notifying the operator S that the reading of the bar code 21 is OK. By the process in step S17, for example, the speaker 10 outputs voice indicating reading OK, and the LED 11 displays information (for example, the price of an item of goods) corresponding to the demodulation bar code data.

Thereafter, the CPU 1 stores the demodulation bar code data which is determined as an appropriate demodulation bar code data in a predetermined block of the temporary buffer 6c, sets a flag in the predetermined block to be "1", and sets the counter values of the temporary permission timer and the temporary prohibition timer to the initial values (step S18). Subsequently, the CPU 1 starts clocking performed by the twice reading prevention timer, the temporary permission timer, and the temporary prohibition timer related to the present demodulation bar code data (step S19), and returns the process to step S1.

On the other hand, when the process shifts to step S20, the CPU 1 determines whether the reading timer ends the operation or not. When the reading timer does not end the operation (S20; N), the CPU 1 returns the process to step S1. In contrast to this, when the reading timer ends the operation (S20; Y), the CPU 1 understands that reading of the bar codes of all goods to be purchased by a customer is completed and performs an accounting process (step S21). More specifically, the CPU 1 calculates the sum total of the prices of the goods to be purchased by the customer, and displays the sum total on the LED 11. Further, the CPU 1 notifies the host machine 201 of the demodulation bar code data (or character value corresponding to the bar code), the reading of which is determined as OK, through the interface circuit 4. Thereafter, the CPU 1 returns the process to step S1 in order to read the bar codes 21 of the goods to be purchased by the next customer.

Figure 8:
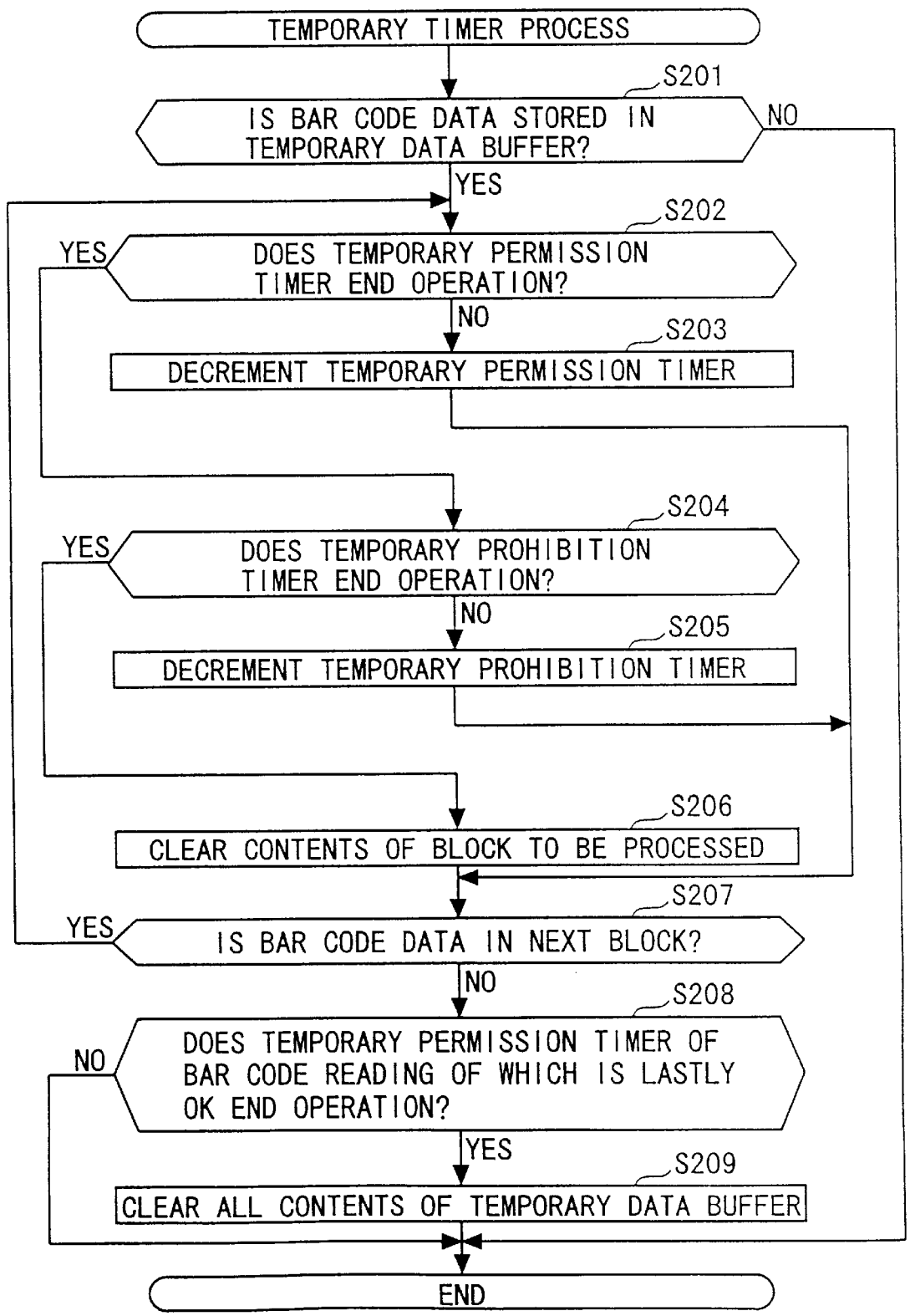
FIG. 8 is a flow chart showing a temporary placed timer process.

In the process in step S19, the CPU 1 executes the temporary timer process shown in FIG. 8. The temporary timer process is executed in parallel to the main routine shown in FIG. 6. In FIG. 8, the CPU 1, first, specifies any one of blocks in the temporary buffer 6c as a block to be processed, and refers to the flag of the block to be processed to determine whether the demodulation bar code data is stored in the block to be processed or not (step S201). At this time, when the flag is "0", i.e., when the demodulation bar code data is not stored (S201; N), the CPU 1 ends the temporary timer process. In contrast to this, when the flag is "1", i.e., when the demodulation bar code is stored (S201; Y), the CPU 1 shifts the process to step S202. For example, in the process of step S201 in the first rotation, the top block of the temporary buffer 6c is specified as a block to be processed. In step S201 in the second rotation, the next block of the top block is specified as a block to be processed.

When the process shifts to step S202, the CPU 1 refers to the counter of the temporary permission timer of the block to be processed to determine whether the temporary permission timer ends the operation or not. At this time, when the temporary permission timer does not end the operation (S202; N), the CPU 1 decrements the counter value of the temporary permission timer (step S203) Thereafter, the CPU 1 shifts the process to step S207. In contrast to this, when the temporary permission timer ends the operation (S203; Y), the CPU 1 shifts the process to step S204.

When the process shifts to step S204, the CPU 1 refers to the counter of the temporary prohibition timer of the block to be processed to determine whether the temporary prohibition timer ends the operation or not. At this time, when the temporary prohibition timer does not end the operation (S204; N), the CPU 1 decrements the count value of the temporary prohibition timer (step S205). Thereafter, the CPU 1 shifts the process to step S207. In contrast to this, when the temporary permission timer ends the operation (S204; Y), the CPU 1 erases the storage contents of the block to be processed and then shifts the process to step S207.

When the process shifts to step S207, the CPU 1 refers to a flag of the next block of the block to be processed to determines whether demodulation bar code data is stored in the next block or not. At this time, when the demodulation bar code data is stored (S207; Y), the CPU 1 specifies the next block as a block to be processed, returns the process to step S202, and performs the processes from steps S202 to S206 to the new block to be processed. In contrast to this, when the demodulation bar code data is not stored (S207; N), the CPU 1 shifts the process to step S208.

When the process shifts to step S208, the CPU 1 determines whether the temporary permission timer related to the demodulation bar code data, the reading of which lastly is OK, ends the operation or not. At this time, when the temporary permission timer does not end the operation (S208; N), the CPU 1 ends the temporary timer process. In contrast to this, when the temporary permission timer ends the operation (S208; Y), the CPU 1 understands that reading of the bar codes 21 of all goods to be purchased by one customer is ended, erases all the contents of the temporary data buffer (step S209), and ends the temporary timer process. Thereafter, each time the process in step S19 is executed, the temporary timer process is executed.

<Specific Example of Process by Bar Code Reader>

Figure 10:
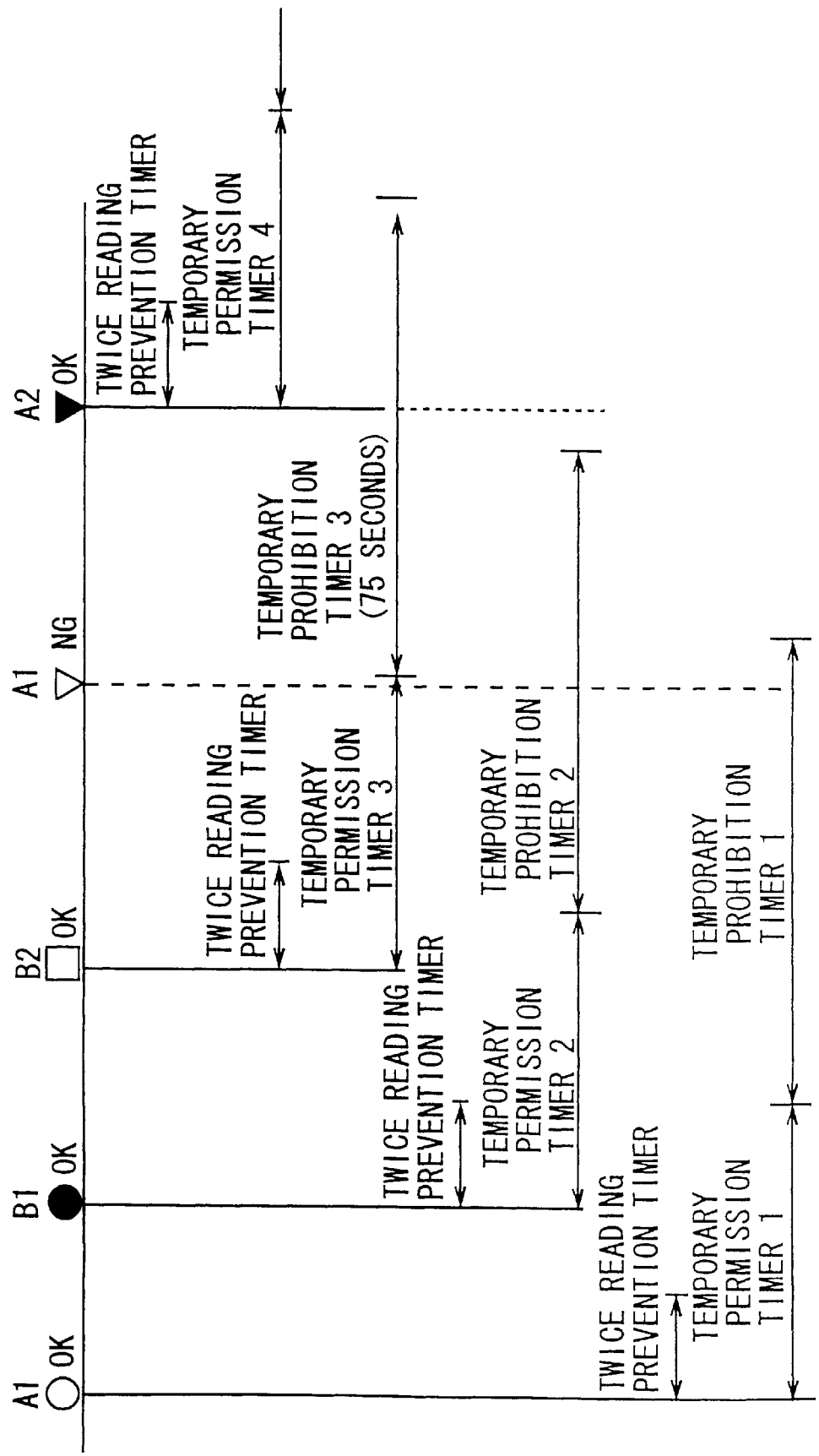
FIG. 10 is a sequence diagram showing a process performed by the bar code reader shown in FIG. 1.
Figure 11:
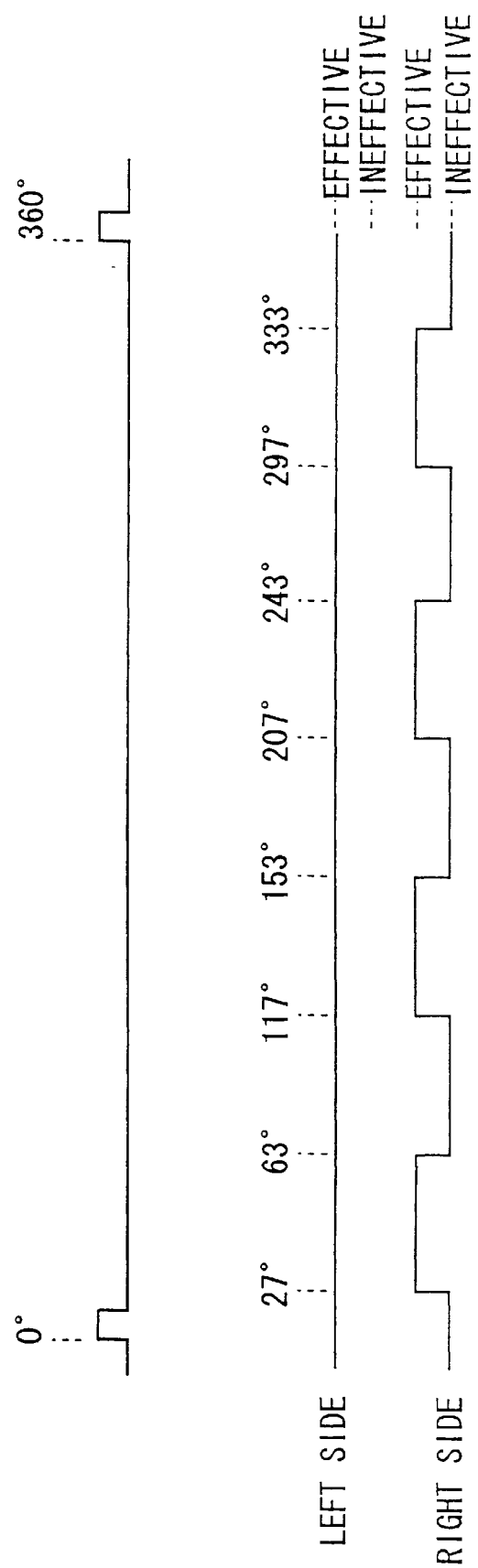
FIG. 11 is a diagram for explaining a modification of the bar code reader according to the embodiment.

As a specific example of the process performed by the bar code reader 50, a case in which the bar code reader 50 discriminates a bar code 21 read by a normal reading operation from a bar code 21 read by temporary placing of goods will be described below. FIG. 10 is a sequence diagram showing the process performed by the bar code reader 50.

When the process is performed by the bar code reader 50, the following is performed as an a prerequisite. For example, when the bar code reader 50 is installed a store as shown in FIG. 1, a customer C places the basket X, in which goods are put in, on the entrance side (right side of the front surface of the bar code reader 50) of the counter 102. Then, the operator S of the bar code reader 50 places the basket Y on the exit side (left side of the front surface of the bar code reader 50) of the counter 102. Thereafter, when the operator S takes the goods out of the basket X and passes the goods in front of the emission window with the bar code 21 attached to the goods facing the emission window 103, the process by the bar code reader 50 is started.

At this time, in the bar code reader 50, it is assumed that no demodulation bar code data is stored in the left bar width data storage area 6a, the right bar width data storage area 6b, the temporary buffer 6c, and the demodulation data storage area 6d of the RAM 6.

For example, as shown in FIG. 10, it is assumed that the operator S takes an item A1 out of the basket X first, and passes the item A1 in front of the emission window 103 from the right area to the left area. Then, the CPU 1 of the bar code reader 50 performs the processes in steps S1 to S12 and step S17 shown in FIG. 6 to determine that reading of the bar code 21 of the item A1 is OK, stores the demodulation bar code data in the temporary buffer 6c (S18), and starts counting performed by the twice reading prevention timer, the temporary permission time, and the temporary prohibition timer (S19). At this time, it is assumed that the operator S does not place the item A1 in the basket Y but temporarily places the item A1 in an empty space (e.g., between the basket X and the basket Y: see the item 108 shown in FIG. 14) of the counter 102.

Thereafter, it is assumed that the operator S takes an item B1 out of the basket X and passes the item B1 in the front of the emission window 103 from the right area to the left area. In this case, the CPU 1 of the bar code reader 50 performs the processes in steps S1 to S12 and steps S17 to S19 shown in FIG. 6, the demodulation bar code data related to the item B1 is stored in the temporary buffer 6c, and clocking performed by the respective timers is started.

Thereafter, it is assumed that the operator S takes an item B2 which is the same as the item B1 from the basket X and passes the item B2 in front of the emission window 103 from the right area to the left area. In this case, the CPU 1 performs the processes in steps S1 to S12 shown in FIG. 6 and determines in step S13 that the temporary permission timer does not end the operation. As a result, the processes in steps S17 to S19 are performed, the bar code related to the item B2 is stored in the temporary buffer 6c, and clocking performed by the respective timer is started.

Thereafter, it is assumed that the operator S picks the temporarily placed item A1 and places the item A1 in the basket Y. At this time, it is assumed that the item A1 entered the right area and that the bar code 21 of the item A1 is read again. In this case, the CPU 1 performs the processes in steps S1 to S13 and shifts the process to step S14. At this time, the temporary prohibition timer for the item A1 stored in the temporary buffer 6c does not end the operation, "NO" is determined in step S14, and reading of the bar code 21 is treated as NG (S7). In this manner, the bar code 21 is prevented from being read twice.

Thereafter, it is assumed that the operator S takes an item A2 which is the same as the item A1 out of the basket X and passes the item A2 in front of the emission window 103 from the right area to the left area. In this case, since the temporary prohibition timer related to the item A1 ends the operation, the data related to the item A1 is erased from the temporary buffer 6c (S206). For this reason, the CPU 1 performs the processes in steps S11 to S12 and steps S17 to S19. Thereafter, when reading of all the bar codes 21 of all the goods held the basket X is ended, the operator S performs a predetermined accounting operation with the consumer C. The customer C leaves the counter 102 with the basket Y holding the goods. Thereafter, the operator S performs the same operation with the next customer C, and the bar code reader 50 performs the same process as described above.

<Operation of Embodiment>

According to the bar code reader 50 of the embodiment of the present invention, the demodulation bar code data, the reading of which is OK, is stored in the temporary buffer 6c, and clocking by the temporary permission timer and the temporary prohibition timer is started with respect to the demodulation bar code data. It is assumed that when the temporary permission timer ends the operation and that the temporary prohibition timer does not end the operation, and the same bar code 21 is read, the demodulation bar code data obtained by the reading is recognized as the data obtained when the bar code 21 of a temporarily placed item, and the appropriateness of the demodulation bar code data is determined as inappropriate. In this manner, the bar code 21 of the temporarily placed item can be prevented from being erroneously read.

When a small number of goods are held in the basket X, or when two or more of the same items are held in the basket X, it is understood that the items are rarely temporarily placed. For this reason, the temporary permission timer is provided. While the temporary permission timer clocks time, reading OK of the demodulation bar code data as the same with the demodulation bar code data stored in the temporary buffer 6c is output.

In step S15 shown in FIG. 6, when the same demodulation bar code data as the demodulation bar code data stored in the temporary buffer 6c is read, and when both the temporary permission timer and the temporary prohibition timer end the operations, reading OK of only the demodulation bar code data of the entire demodulation data is performed. In this manner, conditions that bar code reading is OK are made strict, so that the bar code 21 of the temporarily placed item can be prevented from being erroneously read.

In step S16 shown in FIG. 6, when the character length is 196 counts or more, it is so configured that the bar code reading is determined as not OK. In this configuration, when the operator S internationally have the bar code 21 of an items of goods read by the bar code reader 50, it is noticed that the character length of the bar code 21 is within 196 counts. More specifically, the character length of the bar code 21 is 196 counts or more, it is understood that the bar code 21 of a temporarily placed item is read, and reading of the demodulation bar code data is not OK. In this manner, the bar code 21 of an item of goods which is temporarily placed or which is held in the basket X can be prevented from being erroneously read. In this embodiment, although a count value (allowable value) for determining reading OK or NG is set to be 196 counts, the allowable value may be designed such that the allowable value can be properly changed by the operator S.

In the character length correlation check shown in FIG. 7, when the demodulation be code data is constituted by a plurality of demodulation data, and when the character lengths of the respective demodulation data are not substantially the same (do not satisfy the above described correlation), it is understood that the bar code 21 of the item held in the basket X or the basket Y has been read, and reading of the bar code data is to be NG. In this manner, so-called "basket reading" can be prevented.

<Modification of this Embodiment>

In this embodiment, a rotation timing of the unillustrated polygon mirror is detected to perform switching control for the switching section 22. In place of this, for example, the number of rotations of a motor corresponding to one rotation of the polygon mirror may be detected, and based on this, the angular component of the polygon mirror may be calculated, thereby the switching control of the switching section 22 may be performed. Or, time required for one rotation of the unillustrated polygon mirror may be clocked, and based on this, the angular component of the polygon mirror may be calculated, thereby the switching control of the switching section 22 may be performed.

Figure 12:
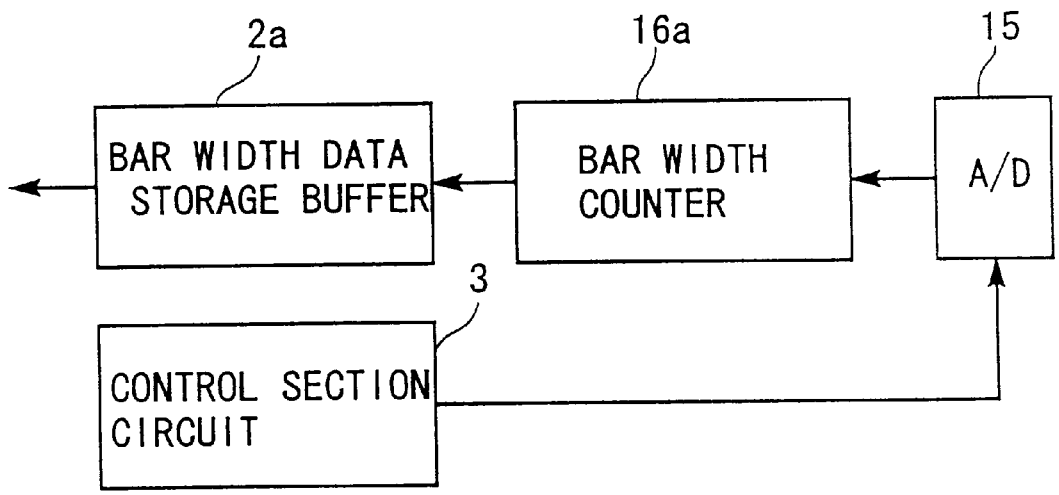
FIG. 12 is a diagram showing a modification of the bar code reader according to the embodiment.

In this embodiment, the switching section 22 has selectors 23 and 24, so that binary signals output from the A/D converter 15 are alternately input to the bar width counters 16a and 16b according to control signals (signal SEL1 and signal SEL2) from the control section circuit 3. In place of this, as shown in FIG. 12, all binary signals output from the A/D converter 15 may be input to the bar width counter 16a. More specifically, an enable signal may be always input to the selector 23 shown in FIG. 4 as the signal SELL. In addition, in this case, the selector 23 may be removed to directly connect the A/D converter 15 to the bar width counter 16a.

In this embodiment, it is determined whether the bar code data is obtained from the right area or the left area by checking whether the bar code data is stored in the left bar width data storage area 6a of the RAM 6 or the right bar width data storage area 6b of the RAM 6 (step S104). In place of this, as shown in FIG. 12, the control section circuit 3 may input information of the right area or the left area to the A/D converter 15, and a binary signal (bar width data) including the information of the right area/left area may be output from the A/D converter 15. In this case, the bar width counter 16b and the bar width data storage buffer 2b shown in FIG. 1 may be excluded, and only one of the left bar width data storage area 6a and the right bar width data storage area 6b may be sufficient. Thus, the configuration of the bar code reader 50 may be simplified.

Figure 13A:
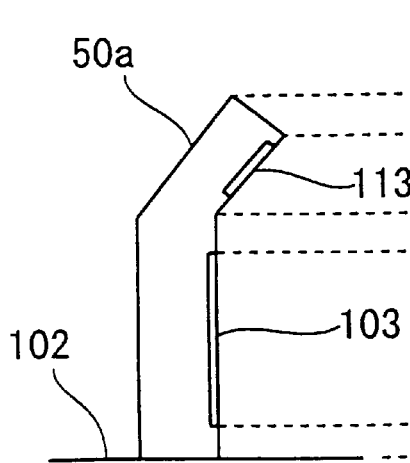
FIGS. 13A and 13B are diagrams showing a modification of the bar code reader according to the embodiment.
Figure 13B:
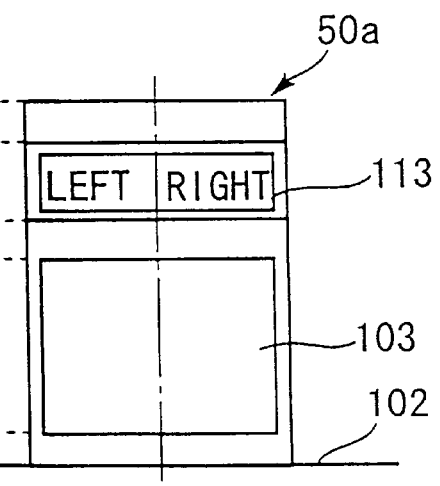

In this embodiment, the bar code reader 50 having only one emission window 103 for emitting the laser beam for scanning the bar code 21 has been described. However, as shown in the side view in FIG. 13A and the front view in FIG. 13B, the present invention may be applied to a bar code reader having, in addition to the emission window 103, an emission window 113 for emitting the laser beam from above the goods. More specifically, the emission windows 103 and 113 are divided by two with respect to a vertical surface, scanning ranges of laser beams emitted from the right sides of the front surfaces of the emission windows 103 and 113 are set as right areas, and scanning ranges of laser beams emitted from the left sides of the front surfaces of the emission windows 103 and 113 are set as left areas, so that the above described processes may be performed to the bar code 21 scanned by the laser beams emitted from the emission windows 103 and 113. The present invention may be also applied to a bar code reader for emitting a laser beam from below the goods.

In this embodiment, the case in which an item of goods moves in the direction from the basket X to the basket Y, i.e., in the direction from the right area to the left area has been described. However, when the item of goods moves in the direction from the basket Y to the basket X, and when the process for the bar code data obtained in the right area and the process for the bar code data obtained in the left area are reversed to each other, the same effect as that in this embodiment can be obtained.

When the entire demodulation data obtained in the left area or the synthesized demodulation data constituted by only the demodulation data obtained in the left area can be obtained, determining the reading OK of these bar code data may not be determined.

Clocking time of the temporary permission timer, clocking time of the temporary prohibition timer, and the number of blocks constituting the temporary buffer 6c may be properly changed by the operator S (the user of the bar code reader 50).

Regardless of the type of the bar code 21, for example, the present invention can be widely applied to read bar codes such as a WPC code, N EAN code, and a JAN code.

According to the bar code reader and the bar code reading method according to the present invention, the bar code of a temporarily placed item of goods or the bar code of the goods held in a basket can be prevented from being erroneously read. More specifically, the same bar code can be prevented from being read twice. In this manner, the sum total of the prices of goods can be prevented from being erroneously calculated.

What is claimed is:

1. A bar code reader comprising:
    a bar code data detection section for scanning a bar code to detect bar code data;
    a demodulation data generation section for generating demodulation bar code data including data of an entire bar code from the bar code data detected by the bar code data detection section;
    a storage section for storing demodulation bar code data generated by the demodulation data generation section;
    a clocking section for, when the demodulation bar code data is stored in the storage section, every demodulation bar code data, starting clocking of permission time in which the appropriateness of the same demodulation bar code data as the corresponding demodulation bar code data is recognized and of prohibition time in which the appropriateness of the same demodulation bar code data as the corresponding demodulation bar code data is rejected and which is ended after a lapse of the permission time;
    an area determining section for, when demodulation bar code data is generated by the demodulation data generation section, specifying the demodulation bar code data as an object to be processed and for determining in which of a first area and a second area the demodulation bar code data to be processed is obtained when a scanning range of the bar code is divided by two with respect to a vertical surface;

a detection section for, when determined by the area determining section that the demodulation bar code data to be processed is obtained in the first area, detecting the same demodulation bar code data as the demodulation bar code data to be processed; and a determining section for, when the clocking of the permission time corresponding to the demodulation bar code data detected by the detection section is ended and the clocking of the prohibition time is not ended, determining the demodulation bar code data to be processed as inappropriate demodulation bar code data.

2. A bar code reader according to claim 1, wherein the determining section determines the demodulation bar code data to be processed as appropriate demodulation bar code data when clocking of permission time corresponding to the demodulation bar code data detected by the detection section is not ended.

3. A bar code reader according to claim 1, wherein the determining section determines the demodulation bar code data to be processed as appropriate demodulation bar code data when determined by the area determining section that the demodulation bar code data to be processed is obtained in the second area.

4. A bar code reader according to claim 1, wherein the bar code reader further comprises:

a character length detection section for detecting a character length of the demodulation bar code data to be processed when the demodulation bar code data is constituted by one bar code data obtained by one scanning operation; and an allowable value storage section for storing an allowable value of the character length of the demodulation bar code data, and wherein the determining section determines the demodulation bar code data to be processed as appropriate demodulation bar code data only when the character length detected by the character length detection section is less than the allowable value stored in the allowable value storage section.

5. A bar code reader according to claim 1, further comprising:

a basic character length detection section for, when the demodulation bar code data is constituted by a plurality of bar code data obtained by a plurality of scanning operations, detecting a basic character length which is a bar width per character of each bar code data constituting the demodulated bar code data; and a second determining section for determining the demodulation bar code data as inappropriate demodulation bar code data when the basic character lengths detected by the basic character length detection section do not satisfy a predetermined correlation.

6. A bar code reader according to claim 5, wherein the demodulation bar code data is formed by synthesizing a first bar code data and a second bar code data with each other, and the second determining section determines the demodulation bar code data as appropriate demodulation bar code data when a difference between a basic character length of the first bar code data and a basic character length of the second bar code data is out of a predetermined range.

7. A bar code reader according to claim 5, wherein the demodulation bar code data is formed by synthesizing a first bar code data, a second bar code data, and a third bar code data with each other, and the second determining section determines the demodulation bar code data as inappropriate demodulation bar code data when a difference between a basic character length of the first bar code data and a basic character length of the second bar code data is out of a predetermined range or when a difference between a basic character length of the second bar code data and a basic character length of the third bar code data is out of a predetermined range.

8. A bar code reader according to claim 1, wherein all the demodulation bar code data stored in the storage section are erased when the clocking section ends the clocking of the permission time corresponding to the demodulation bar code data which is lastly stored in the storage section.

9. A bar code reader according to claim 1, further comprising:

a first area data storage section for storing the bar code data obtained in the first area of the bar code data detected by the bar code detection section; and a second area data storage section for storing the bar code data obtained in the second area of the bar code data detected by the bar code detection section, and the area determining section determines whether the demodulation bar code data to be processed is generated from the bar code data stored in the first area data storage section or the second area data storage section, thereby to determines whether the demodulation bar code data to be processed is obtained in the first area or the second area.

10. A bar code reader according to claim 1, wherein the bar code data detection section generates a bar code data including a data type indicating that it is obtained in the first area or the second area, the demodulation data generation section generates a demodulation bar code data including the data type, and the area determining section determines, based on the data type included in the demodulation bar code data to be processed, whether the demodulation bar code data to be processed is obtained in the first area or the second area.

11. A bar code reading method comprising:

a bar code data detection step of scanning a bar code to detect bar code data;

a demodulation data generation step of generating demodulation bar code data including data of the entire bar code from the bar code data detected in the bar code data detection step;

a storage step of storing a plurality of demodulation bar code data generated in the demodulation data generation step;

a clocking step for, when the demodulation bar code data is stored in the storage step, every demodulation bar code data, starting clocking of permission time in which the appropriateness of the same demodulation bar code data as the corresponding demodulation bar code data is recognized and of prohibition time in which the appropriateness of the same demodulation bar code data as the corresponding demodulation bar code data is rejected and which is ended after a lapse of the permission time;

an area determining step of, when the demodulation bar code data is generated in the demodulation data generation step, specifying the demodulation bar code data as an object to be processed and for determining whether the demodulation bar code data to be processed is obtained in a first area or a second area when a scanning range of the bar code is divided by two with respect to a vertical surface;

a detection step of, when determined in the area determining step that the demodulation bar code data to be processed is obtained in the first area, for detecting the same demodulation bar code data as the demodulation bar code data to be processed from a plurality of demodulation bar code data stored in the storage step; and a determining step of, when the clocking of the permission time corresponding to the demodulation bar code data detected in the detection step is ended and the clocking of the prohibition time is not ended, determining the demodulation bar code data to be processed as inappropriate demodulation bar code data.

12. A bar code reading method according to claim 11, wherein the determining step determines the demodulation bar code data to be processed as appropriate demodulation bar code data when clocking of permission time corresponding to the demodulation bar code data detected in the detection step is not ended.

13. A bar code reading method according to claim 11, wherein the determining section determines the demodulation bar code data to be processed as appropriate demodulation bar code data when determined in the area determining step that the demodulation bar code data to be processed is obtained in the second area.

14. A bar code reading method according to claim 11, further comprising:

a character length detection step of detecting a character length of the demodulation bar code data to be processed when the demodulation bar code data is constituted by one bar code data obtained by one scanning operation, and wherein the determining step determines the demodulation bar code data to be processed as appropriate demodulation bar code data only when the character length detected by the character length detection is less than a predetermined allowable value.

15. A bar code reading method according to claim 11, further comprising:

a basic character length detection step of, when the demodulation bar code data is constituted by a plurality of bar code data obtained by a plurality of scanning operations, detecting a basic character length which is a bar width per character of each bar code data constituting the demodulated bar code data; and a second determining step of determining the demodulation bar code data as inappropriate demodulation bar code data when basic character lengths detected in the basic character length detection step do not satisfy a predetermined correlation.

16. A bar code reading method according to claim 15, wherein the demodulation bar code data is formed by synthesizing a first bar code data and second bar code data with each other, and the second determining step determines the demodulation bar code data as inappropriate demodulation bar code data when a difference between a basic character length of the first bar code data and a basic character length of the second bar code data is out of a predetermined range.

17. A bar code reading method according to claim 15, wherein the demodulation bar code data is formed by synthesizing a first bar code data, a second bar code data, and a third bar code data with each other, and the second determining step determines the demodulation bar code data as inappropriate demodulation bar code data when a difference between a basic character length of the first bar code data and a basic character length of the second bar code data is out of a predetermined range or when a difference between a basic character length of the second bar code data and a basic character length of the third bar code data is out of a predetermined range.

18. A bar code reading method according to claim 11, wherein all the demodulation bar code data stored in the storage section are erased when the clocking of the permission time corresponding to the demodulation bar code data which is lastly stored in the storage step.

19. A bar code reader comprising:

a light receiving section for receiving reflected light from a bar code scanned by a scanning light to output an electric signal corresponding to an amount of received light;

a demodulation section for demodulating the electric signal output from the light receiving section to generate a demodulation bar code data;

a storage section for storing the demodulation bar code data;

a clocking section for starting clocking of first time when the demodulation bar code data is stored in the storage section;

an area determining section for determining whether the demodulation bar code data demodulated by the demodulation section is scanned in a first area or a second area obtained by dividing a scanning range of the scanning light;

a discriminating section for determining whether the demodulated bar code data coincides with the demodulation bar code data which was demodulated prior to the demodulation bar code data and stored in the storage section; and a determining section for determining the demodulation bar code data as inappropriate demodulation bar code data when the bar code data is scanned in the first area, when discriminating section determines that the demodulated bar code data coincides with the already demodulated bar code data, and when the first time has elapsed.

20. A bar code reader comprising:

a light receiving section for receiving reflected light from a bar code scanned by a scanning light to output an electric signal corresponding to an amount of received light;

a demodulation section for demodulating the electric signal output from the light receiving section to generate a demodulation bar code data;

a storage section for storing the demodulation bar code data;

an area determining section for determining whether the demodulation bar code data demodulated by the demodulation section is scanned in a first area or a second area obtained by dividing a scanning range of the scanning light;

a discriminating section for determining whether the demodulated bar code data coincides with the demodulation data demodulated prior to the demodulation bar code data and stored in the storage section; and a determining section for determining the demodulation bar code data as inappropriate demodulation bar code data when the bar code data is scanned in the first area and when the determining section determines that the demodulated bar code data coincides with the already demodulated bar code data.

* * * * *